G. F. ROWE & J. F. JOHNSTON.
FLOATING CRIB FOR TRANSPORTATION OF PULP WOOD.
APPLICATION FILED OCT. 8, 1906.

902,253.

Patented Oct. 27, 1908.

Witnesses.

Inventors.
George F. Rowe
Jackson F. Johnston

UNITED STATES PATENT OFFICE.

GEORGE FREEMAN ROWE, OF BANGOR, MAINE, AND JACKSON FLEMING JOHNSTON, OF MISPEC, NEW BRUNSWICK, CANADA.

FLOATING CRIB FOR TRANSPORTATION OF PULP-WOOD.

No. 902,253.     Specification of Letters Patent.     Patented Oct. 27, 1908.

Application filed October 8, 1906. Serial No. 337,881.

*To all whom it may concern:*

Be it known that we, GEORGE F. ROWE, a citizen of the United States, and a resident of the city of Bangor, in the State of Maine, one of the United States of America, and JACKSON F. JOHNSTON, a subject of His Majesty King Edward VII, of the United Kingdom of Great Britain and Ireland, residing at Mispec, in the city and county of St. John, in the Province of New Brunswick, in the Dominion of Canada, have invented a new and useful Floating Crib for Transportation of Pulp-Wood, of which the following is a specification.

Figure 1:
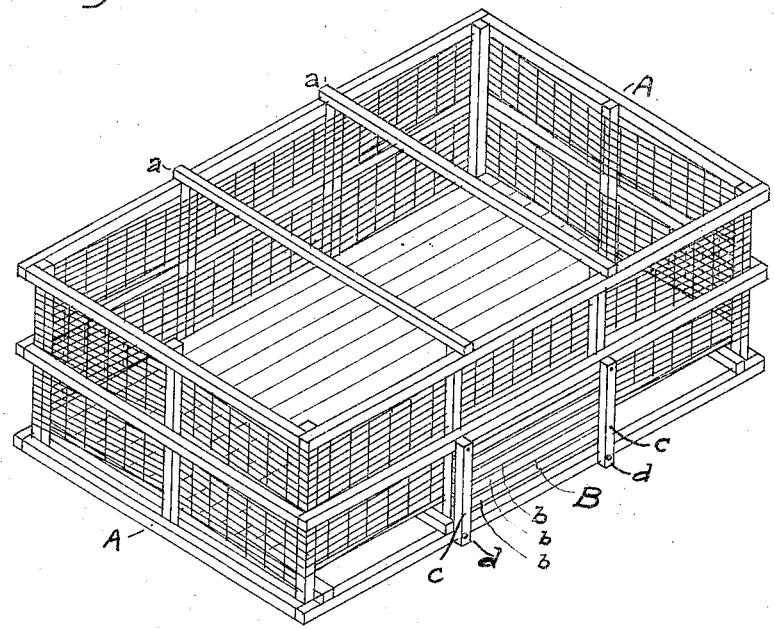
Figure 2:
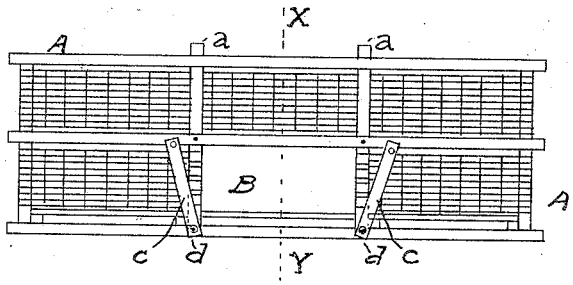
Figure 3:
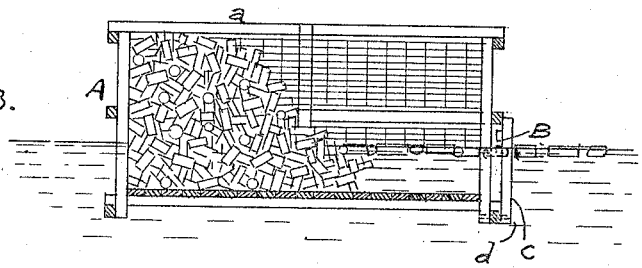

Our invention consists of a floatable cage or crib constructed for the transportation by water of pulp-wood, which generally speaking, consists of logs cut into short lengths, and is fully illustrated in the accompanying drawing in which Figure 1 is a perspective view of crib with gate closed. Fig. 2 is a side view of crib showing the gate open. Fig. 3 is a cross-section of crib through the gate on the line X Y of Fig. 2.

Similar letters refer to corresponding parts throughout the figures.

Ordinary vessels are not well adapted to the purpose as the labor and expense of unloading the wood would render their use impracticable.

Our device consists of a strong frame of timber A preferably rectangular, as shown in Fig. 1, having ends, sides and bottom, but no top. The ends, sides and bottom are constructed of slats in skeleton form with intervening spaces, or of wire-mesh, or an equivalent, no attempt being made to exclude water. The crib is strengthened by cross pieces $a$ to prevent lateral spreading when it is loaded, and, at one or both sides or ends, a gate B of similar skeleton or open-work formation, and capable of being opened and closed from above the load-line of the crib, is constructed, said gate extending from the bottom of the crib upwards substantially to the load-line.

The gate may be of any convenient form and may be arranged to be raised and lowered, to swing on hinges, or, as shown in the drawing, may consist of removable slats $b$ secured and locked in position by swinging bars $c$ the lower ends of which are pivoted to the sill of the crib at $d$ and arranged to be locked at their upper ends to some convenient part of the frame A substantially at or above the load-line in a substantially perpendicular position, an essential feature of the gate arrangement being that it shall be so constructed as that its operation may be controlled from above or near the load-line.

In operation the crib is floated to the desired location, the gate is closed, the pulp-wood is dumped in from above, the crib is towed to the point where it is to be discharged, the gate which is then submerged to its top is opened from above, and the pulp-wood floats out through the gate impelled by the pressure of the load above with occasional manual assistance, the crib steadily rising as its load is diminshed.

The slats forming the ends, sides and bottom of the crib are sufficiently near together to prevent the logs from dropping through the intervening spaces, and this form of construction offers a minimum of resistance to the wind when the empty crib is being towed back to the loading port after having been discharged. This feature together with the ease, rapidity and consequent economy with which it can be loaded from the top and discharged from the bottom (which we believe to be totally different from any device in use) constitute the important features of our invention.

Having thus described our invention what we claim and desire to secure by Letters Patent is—

The combination of a floating timber-crib having an open top and skeleton ends, sides and bottom and fitted with a gateway extending from the bottom of the crib upwards substantially to or above the load-line; a gate adapted to close said gateway; and swinging lock-bars the lower ends of which are pivoted to the sill of the gateway and the upper ends adapted to be locked outside the gate to some convenient part of the frame above or near the load-line.

GEORGE FREEMAN ROWE.
             JACKSON FLEMING JOHNSTON.

Witnesses:
    JOHN JOSEPH PORTER,
    HELEN PARKER LITTLEHALE.